Figure 1:
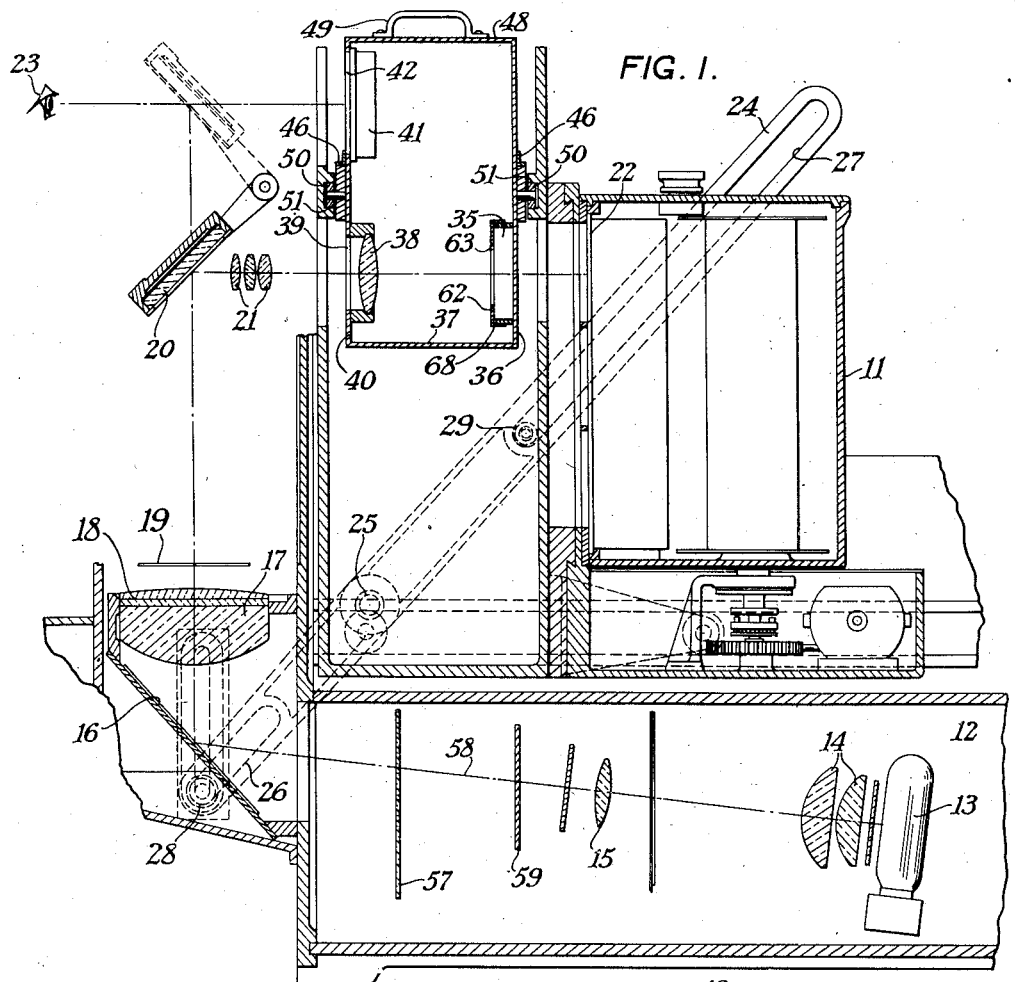

Aug. 22, 1944.   B. E. LUBOSHEZ   2,356,464
PHOTOELECTRIC EXPOSURE CONTROL
Filed March 13, 1943

BENJAMIN E. LUBOSHEZ
INVENTOR

BY
ATTORNEYS

Patented Aug. 22, 1944

2,356,464

UNITED STATES PATENT OFFICE 2,356,464

PHOTOELECTRIC EXPOSURE CONTROL

Benjamin E. Luboshez, Rochester, N. Y., assignor to Eastman Kodak Company, Rochester, N. Y., a corporation of New Jersey Application March 13, 1943, Serial No. 479,103

9 Claims. (Cl. 88—24)

The present invention relates to a photoelectric exposure control device for projection printers or enlargers, and more particularly for an auto-focusing enlarger of the type shown and described in the patent to Luboshez, No. 2,256,396, issued December 16, 1941.

In this patent, a system of exposure timing is described which involves the use of a so-called "viewing box." This consists of optical arrangements united in a conventional box which are automatically brought into the printing beam before exposure, removed during exposure, and again brought back into the beam for the next picture. This "viewing box" intercepts the light before it reaches the printing plane and a smaller image of the square central region of the picture is projected upon a ground glass. This ground glass is surrounded by an illuminate border; and, by means of conveniently located viewing arrangements, the observer sees the picture and border together. The illuminated border serves as a standard, and suitable adjusting means are used to match the intensity of the image to that of the border, such adjusting means regulating the exposure settings.

This system although satisfactory for certain printing processes can in others be advantageously replaced by photoelectric exposure control methods, one of which is embodied in the present invention, according to which a photoelectric cell is housed in a box which replaces the "viewing box" above mentioned, and which moves in and out of the printing beam as before. The cell, preferably of the photovoltaic type, is arranged in the back of the box and faces forward toward the objective of the printer and the incident light. In front of the cell, a convex auxiliary lens is arranged to focus the image-forming rays (which if allowed to proceed further would form the picture on the paper of the printer) on the surface of the cell. Thus, when the box is in the beam before exposure, a reduced image of the picture to be printed is formed on the surface of the cell.

The image upon the cell always remains sharp irrespective of the size of the original negative and the magnification. This is because the auto-focusing mechanism, described in the above-mentioned patent to Luboshez, always maintains the picture and the objective planes in correct relation so that at all magnifications the image on the paper is sharply in focus. When, however, the device of the present invention is in front of the paper intercepting the image, the auxiliary lens, located in the front of the box, receives the image-forming rays and brings them to a focus at a nearer point, namely, on the surface of the cell. Since the distance of the auxiliary lens from the cell is constant and also the distance of this lens from the paper plane is also constant, the image on the cell will always remain sharp so long as the power of the lens was correctly determined initially. Also, the size of the image on the cell surface will be smaller than that on the paper and the relationship between the two will be constant. Thus, any light intensity measured at the cell will bear a constant relationship to the light intensity reaching the paper during exposure. As mentioned in the Luboshez patent, the printer is arranged so that the printed pictures are always the same width irrespective of the negative being used, and that the length of each picture, therefore, depends upon the proportions of the original. If the whole of the picture is focused on the cell, the question of shape would have to be taken into account. In order to eliminate this, a square mask may be placed in front of the cell for certain types of work.

According to preferred form of the invention, the photocell box is a self-contained unit with no external electrical connection. In this form, the cell is connected directly to a galvanometer, the reading of which can be seen by the operator through the viewing-system opening at the front of the printer. The operator takes a reading and sets the exposure accordingly so that when the printing cycle starts the box is moved out of the beam, the exposure taking place according to the indication of the photocell.

The present invention, has, therefore, as its principal object, the provision of a photoelectric exposure control device in which the image on the cell always remains sharp and in focus irrespective of the size of the negative or the magnification thereof.

A further object of the invention is the provision of a photoelectric exposure control device which is self-contained but which may be readily and easily mounted on the enlarger or removed therefrom for calibration or repairs.

Yet another object of the invention is the provision of a device of the class described, the parts of which are so arranged relative to each other that the light intensity on the element will always bear a constant relationship to the light intensity reaching the printing paper during the exposure.

Still another object of the invention is the provision of a self-contained photoelectric exposure control device which is simple in construction, rugged, embodying few parts, readily and easily mounted on or removed from the enlarger, and highly effective in use.

To these and other ends, the invention resides in certain improvements and combinations of parts, all as will be hereinafter more fully described, the novel features being pointed out in the claims at the end of the specification.

In the drawing:

Fig. 1 is a vertical sectional view through an auto-focus enlarger, parts of which are omitted for clarity, showing the relation thereto of a self-contained photoelectric exposure control device constructed in accordance with the present invention.

Figure 2:
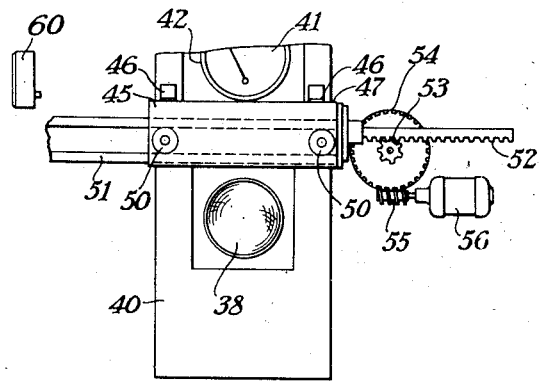
Figure 3:
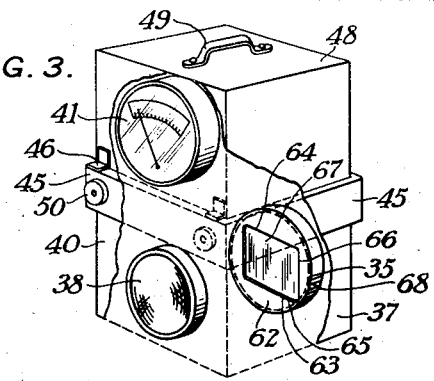

Fig. 2 is a transverse view through a portion of the enlarger illustrated in Fig. 1, showing the mechanism by which the device of the present invention may be moved into and out of operating position; and Fig. 3 is a perspective view, with parts of the housing broken away, of a self-contained photoelectric exposure control device constructed in accordance with the present invention and showing the relation of the various parts.

Similar reference numerals throughout the various views indicate the same parts.

The photoelectric exposure control device of the present invention is shown and described, in the present instance, in connection with an auto-focusing enlarging printer of the type illustrated in the above-mentioned patent to Luboshez, to which reference may be had for a complete description. Only so much of such an enlarger as is necessary for a complete understanding of the present invention is shown herein. While the device is shown in connection with an auto-focusing enlarger, this is by way of illustration only as it is apparent that the device may be used with enlargers of various designs.

The enlarger comprises, in general, a camera 11 carried by and horizontally movable on a supporting housing 12. Light from a lamp 13, mounted in the housing 12, travels in a substantially horizontal line through suitable condensers 14 and a lens 15 to a reflector 16, from which it is deflected upwardly through a lens 17 to a gate 18 adapted to hold in position an image-bearing film 19. The image on the film is projected upwardly, by the light rays, to a hinged reflector 20 which, when in a full-line position, reflects the projected image through a projection lens unit 21 onto a strip of sensitized paper, not shown, positioned in the paper holder 22. The mirror 20 may be moved to the dotted line position so that the observer at the observing station 23 may view the image of the film 19 in the gate 18. In order to change the magnification, the film gate 18 is vertically movable and the paper holder 22 is horizontally movable. The correct relative movement of these members is achieved by means of a lever 24 pivoted at 25 and formed with a pair of slots 26 and 27 adapted to receive studs 28 and 29 connected to the gate 18 and the paper holder 22 respectively. As the above-described mechanism does not per se constitute a part of the present invention, a further discussion is not deemed necessary. Reference may be had to the above-mentioned patent to Luboshez in which the mechanisms are described in detail.

The intensity of the projected image is measured by a light-sensitive member, such as a photovoltaic cell 35, positioned on the back wall 36 of a hollow housing 37 of the shape best shown in Fig. 3. The cell faces towards the lens 21, and is in optical alignment with an auxiliary focusing lens 38 mounted in an opening 39 formed in the front wall 40 of the housing 37. A meter, such as a galvanometer 41, is connected to the cell 35 and is mounted on the front wall 40 above the lens 38 and behind an opening 42, so that the reading of the galvanometer may be viewable from the viewing station 23, as clearly shown in Fig. 1.

The housing 37 is so shaped that the distance between the lens 38 and the cell 35 is fixed, and the lens is also maintained a fixed distance from the sensitized paper in the holder 22, as will be later described. Through the auto-focusing mechanism, briefly described above, the image upon the printing paper always remains sharp irrespective of the size of the negative or the magnification. When, however, the housing 37 has been moved into operative position so that the lens 38 and cell 35 are arranged in the path of the projected image to intercept the latter before it reaches the printing paper, the lens 38 receives the image-forming rays and brings them to focus at a nearer point, namely, on the surface of the cell 35. Since the distance of the lens 38 to the cell 35 is constant, and also the horizontal distance of this lens from the printing paper plane is also constant, the image on the cell will always remain sharp so long as the power of the lens 38 was correctly determined initially. Also, the size of the image on the surface of the cell 35 will be smaller than that on the paper, the relationship between the two images will, however, be constant. Thus any light intensity measured at the cell 35 will have a constant relationship with the light intensity reaching the paper during exposure. Furthermore, the light intensity on the cell 35 is indicated on the meter 41, the scale of which is calibrated to give the required exposure time.

The housing 37 with its cell 35, lens 38, and meter 41, provide a self-contained unit with no external electrical connection, as is apparent. In order to properly position the housing 37, and more particularly the lens 38, in proper horizontal spaced relation with the sensitized printing paper, the camera 20 is supplied with a hollow supporting member 45 of the shape best shown in Fig. 3, and of such size as to slidably receive the housing 37, as will be apparent from an inspection of Fig. 3. When the housing 37 is fitted in position in the support 45, the lens 38 is automatically positioned the proper fixed horizontal distance from the plane of the printing paper. Such positioning of the housing 37 serves to bring pairs of clips 46 carried on the back and front walls 36 and 40 of the housing 37 into engagement with the upper edges 47 of the support 45 to properly position the housing vertically so that the cell 35 and the lens 38 will lie on the axis of the projection lens 21 and in the path of the projected image. The top wall 48 of the housing 37 is provided with a handle 49 by which the housing may be held during its positioning in the support 45, or by which the housing 37, with the exposure control members, may be removed as a unit for calibration, repairs or replacement.

During the light measuring operation, the cell 35 and the lens 38 are in the path of the projected image, as is apparent. However, after such a measurement has been completed, the exposure control device is then moved to an inoperative position out of the path of the image-bearing rays. Obviously, this movement could be accomplished by merely lifting the housing 37 out of the support 45. It is preferred, however, to shift the housing 37 and its support 45 as a unit transversely of the projected image. To secure this result, the support 45 is provided with rollers 50 arranged to roll or move along guides 51 carried by the frame of the camera 11, as best shown in Fig. 1. The support 45 is shifted transversely by a rack 52 which engages a pinion 53 connected by a worm gear 54 and worm 55 to a motor 56. When the housing 37 is moved completely out of the path of the projected image, an electrical switch 60 is operated to shut off the motor to arrest further movement thereof.

With the above-described arrangement, the reading of the galvanometer will vary with the density of the negative to be printed and/or with the variation of magnification. The greater the mean density of the negative or the greater the magnification the greater the exposure time required. In a modified arrangement, however, the galvanometer 40 may be maintained at a constant value by moving a graduated density wedge into the beam. To secure this result, the density wedge 57 is positioned in the housing 12 and is movable into the path of the light beam 58 from the lamp 13, as shown in Fig. 1. The position of this wedge is adjusted until the galvanometer reading reaches a definite value. This method lends itself to a simple means of correcting for different paper sensitivities since the galvanometer pointer can be maintained at any selected point on the scale. This position is determined experimentally for each kind of paper with the appropriate filter 59 in the beam.

In some types of work, in order to eliminate the disturbing effect that variations in picture shape would have upon the amount of light reaching the cell, an opaque mask 62, with a square aperture 63 in it, is placed in front and close to the cell 35, as shown in Figs. 1 and 3. The upper and lower edges 64 and 65 respectively of the mask coincide with the long edge of the picture, and the sides 66 of the mask, cut off the sides of the picture leaving only a central square area 67. This area is used for judging the exposure. Such a mask eliminates the necessity of taking into account variations in the shape of the picture. The mask may be carried by a suitable frame 68 adapted to slip over the cell, as shown in Figs. 1 and 3.

It is thus apparent from the above description that the present invention provides a self-contained photoelectric exposure control device which is detachably mounted on the printer and is movable as a unit with the paper holder towards and away from the film gate, and also movable transversely of the holder to move the device into and out of operative position in the path of the projected image. Furthermore, the image of the cell will always be sharp and in focus irrespective of the size of the image or the magnification thereof. Also, the light intensity measured at the cell will bear a constant relationship to the light intensity reaching the printing paper during exposure.

While certain embodiments of the invention have been disclosed, it is to be understood that the inventive idea may be carried out in a number of ways. This application is, therefore, not to be limited to the precise details described, but is intended to cover all variations and modifications thereof falling within the scope of the appended claims.

I claim:

1. The combination with a photographic enlargeing printer comprising a printing lamp, a negative positioned in front of said lamp and provided with an image, a projection lens for projecting said image, and a movable sensitized paper holder positioned to receive the projected image, of a light sensitive element positionable in the path of said projected image intermediate said lens and said holder and operatively connected to the latter for movement therewith, a meter connected to said element, and a positionable auxiliary lens arranged in alignment with said element and spaced a fixed distance from said holder and a fixed distance from said element to focus said image on said element.

2. The combination with a photographic enlarging printer comprising a printing lamp, a negative positioned in front of said lamp and provided with an image, a projection lens for projecting said image, and a sensitized paper holder positioned to receive the projected image, of a light sensitive element positionable in the path of said projected image, a meter connected to said element, an auxiliary lens arranged in alignment with said element and spaced a fixed distance from said holder and a fixed distance from said element to focus said image on said element, a unitary housing for said element, meter, and auxiliary lens, and means for detachably connecting said housing to said printer and for mounting said housing for movement into and out of the path of said projected image.

3. The combination with a photographic enlarging printer comprising a gate for holding a film the image of which is to be projected, a printing lamp positioned behind said film, a projection lens for projecting said image, a paper holder positioned to receive the projected image and movable relative to said gate to vary the magnification, of a light sensitive element positioned in the path of said projected image, a meter connected to said element, an auxiliary lens for focusing said projected image on said element, and means for mounting said element, meter and auxiliary lens on said printer for movement as a unit with said holder relative to said gate.

4. The combination with a photographic enlarging printer comprising a gate for holding a film the image of which is to be projected, a printing lamp positioned behind said film, a projection lens for projecting said image, a paper holder positioned to receive the projected image and movable relative to said gate to vary the magnification, of a light sensitive element positioned in the path of said projected image, a meter connected to said element, an auxiliary lens for focusing said projected-image on said element, and means for mounting said element, meter and auxiliary lens on said printer for movement as a unit with said holder relative to said gate and also for unitary movement relative to said holder and transversely of said path for moving said lens and element into and out of operative position in said path.

5. The combination with a photographic enlarging printer comprising a gate for holding a film the image of which is to be projected, a printing lamp positioned behind said film, a projection lens for projecting said image, a paper holder positioned to receive the projected image and movable relative to said gate to vary the magnification, of an auxiliary lens positioned in the path of said projected image and spaced a fixed distance from said holder, a light sensitive element positioned in optical alignment with said auxiliary lens and spaced therefrom a fixed distance so that the auxiliary lens will focus the projected image on said element, a meter connected to said element to indicate the light incident thereon, and means for moving said lens and element as a unit into and out of said path.

6. The combination with a photographic enlarging printer comprising a gate for holding a film the image of which is to be projected, a printing lamp positioned behind said film, a projection lens for projecting said image, a paper holder positioned to receive the projected image and movable relative to said gate to vary the magnification, of an auxiliary lens positioned in the path of said projected image and spaced a fixed distance from said holder, a light sensitive element positioned in optical alignment with said auxiliary lens and spaced therefrom a fixed distance so that the auxiliary lens will focus the projected image on said element, and a unitary housing for said auxiliary lens, element and meter removably mounted on said printer.

7. The combination with a photographic enlarging printer comprising a gate for holding a film the image of which is to be projected, a printing lamp positioned behind said film, a projection lens for projecting said image, a paper holder positioned to receive the projected image and movable relative to said gate to vary the magnification, of an auxiliary lens positioned in the path of said projected image and spaced a fixed distance from said holder, a light sensitive element positioned in optical alignment with said lens and spaced therefrom a fixed distance according to the focal length of said lens so that the latter will focus the projected image on said element, a meter connected to said element, a unitary housing for said auxiliary lens, element and meter removably mounted on said printer, and means for mounting said housing on said printer for movement as a unit with said holder and transversely of said path for moving said lens and element into and out of operative position in said path.

8. The combination with a photographic enlarging printer comprising a gate for holding a film the image of which is to be projected, a printing lamp positioned behind said film, a projection lens for projecting said image, a paper holder positioned to receive the projected image and movable relative to said gate to vary the magnification, of a light sensitive element positioned in the path of said projected image, a meter connected to said element, an auxiliary lens for focusing said projected image on said element, a mask for said element, and means for mounting said element meter and auxiliary lens on said printer for movement as a unit with said holder relative to said gate and also for unitary movement relative to said holder and transversely of said path for moving said auxiliary lens and element into and out of operative position in said path.

9. The combination with a photographic enlarging printer comprising a gate for holding a film the image of which is to be projected, a printing lamp positioned behind said film, a projection lens for projecting said image, a paper holder positioned to receive the projected image and movable relative to said gate to vary the magnification, of an auxiliary lens positioned in the path of said projected image and spaced a fixed distance from said holder, a light sensitive element positioned in optical alignment with said lens and spaced therefrom a fixed distance so that the auxiliary lens will focus the projected image on said element, a meter connected to said element, a unitary housing for said auxiliary lens, element and meter removably mounted on said printer, a mask positioned over said element to block off a portion of the image focus thereon by said lens, and means for mounting said housing on said printer for movement as a unit with said holder relative to said gate and also for movement relative to said holder and transversely of said path for moving said auxiliary lens and element into and out of operative position in said path.

BENJAMIN E. LUBOSHEZ.